(12) United States Patent
Bade et al.

(10) Patent No.: US 9,122,875 B2
(45) Date of Patent: Sep. 1, 2015

(54) TRUSTED PLATFORM MODULE DATA HARMONIZATION DURING TRUSTED SERVER RENDEVOUS

(75) Inventors: Steven A. Bade, Georgetown, TX (US); Richard A. Dayan, Wake Forest, NC (US); James T. Hanna, Austin, TX (US); Andrew G. Kegel, Redmond, WA (US)

(73) Assignee: International Business Machines Corporation, Armonk, NY (US)

( * ) Notice: Subject to any disclaimer, the term of this patent is extended or adjusted under 35 U.S.C. 154(b) by 1806 days.

(21) Appl. No.: 11/381,237

(22) Filed: May 2, 2006

(65) Prior Publication Data

US 2007/0260545 A1 Nov. 8, 2007

(51) Int. Cl.
*G06F 21/57* (2013.01)

(52) U.S. Cl.
CPC .............. *G06F 21/57* (2013.01); *G06F 21/575* (2013.01); *H04L 2463/101* (2013.01)

(58) Field of Classification Search
CPC ..................................................... G06F 21/57
USPC .......... 713/194; 709/201, 202, 203, 223, 224, 709/225
See application file for complete search history.

(56) References Cited

U.S. PATENT DOCUMENTS

| 7,382,880 | B2* | 6/2008 | Angelo et al. ................. 380/259 |
| 2005/0021968 | A1 | 1/2005 | Zimmer et al. |
| 2005/0033987 | A1 | 2/2005 | Yan et al. |
| 2005/0135626 | A1 | 6/2005 | Ball et al. |
| 2005/0138393 | A1 | 6/2005 | Challener et al. |
| 2005/0246525 | A1* | 11/2005 | Bade et al. ..................... 713/164 |
| 2005/0251857 | A1 | 11/2005 | Schunter et al. |
| 2005/0257073 | A1* | 11/2005 | Bade et al. ..................... 713/193 |
| 2007/0239748 | A1* | 10/2007 | Smith ........................... 707/101 |

OTHER PUBLICATIONS

Sailer et al.; Attestation-based policy enforcement for remote access; Published in: Proceeding CCS '04 Proceedings of the 11th ACM conference on Computer and communications security; 2004; pp. 308-317; ACM Digital Library.*

Reid et al.; Privacy and trusted computing; Published in: Database and Expert Systems Applications, 2003. Proceedings. 14$^{th}$ International Workshop on; Date of Conference: Sep. 1-5, 2003; pp. 383-388; IEEE Xplore.*

* cited by examiner

*Primary Examiner* — Bradley Holder
(74) *Attorney, Agent, or Firm* — Steven M. Greenberg, Esq.; CRGO Law

(57) ABSTRACT

Embodiments of the present invention address deficiencies of the art in respect to trusted platform module (TPM) unification in a trusted computing environment and provide a novel and non-obvious method, system and computer program product for trusted platform module data harmonization. In one embodiment of the invention, a TPM log harmonization method can include designating both a single master TPM for a master node among multiple nodes, and also a multiplicity of subsidiary TPMs for remaining ones of the nodes. The method further can include extending the single master TPM with a measurement representing a rendezvous operation for the nodes.

10 Claims, 2 Drawing Sheets

TRUSTED PLATFORM MODULE DATA HARMONIZATION DURING TRUSTED SERVER RENDEVOUS

BACKGROUND OF THE INVENTION

1. Field of the Invention

The present invention relates to the field of trusted computing and more particularly to the rendezvous process of a trusted platform module (TPM).

2. Description of the Related Art

Trusted computing refers to the arrangement of hardware, firmware and software components in a computing system in order to prevent information leakage in the computing system. Initially applied to the problem of digital rights management (DRM) in sound recordings and audiovisual works, trusted computing has been broadly envisioned to provide next generation DRM for a more diverse selection of works of authorship—particular documents and electronic communications. Through trusted computing initiatives, presently advanced by the not-for-profit organization, the Trusted Computing Group of Portland, Oreg., trusted computing intends to provide a more secure and trusted computing platform.

The principal portion of a trusted computing environment includes a trusted platform. The trusted platform generally includes a tamper resistant processor able to accept a number of kernel calls for random number generation, key creation, key management, secret management and encryption. The kernel of the trusted platform includes a configuration for measuring the state of the trusted platform including a hosted operating system, and can support the expression of attestations about the state of the operating system hosted in the trusted platform. In as much as the trusted platform itself is secure, these attestations can be taken as truth and hence are "trustworthy".

The Trusted Computing Group defines a trusted platform to have a single trusted platform module (TPM). The TPM can be thought of as a specialized peripheral device into which system measurements can be recorded in a reliable and trusted manner. The recorded measurements taken by the TPM generally when viewed as a whole describe the system configuration and the sequence of events that led to the current configuration. As such, it is recommended that the TPM maintain a log of events wherein each entry in the log corresponds to each recorded measurement in the TPM in the recorded order.

By convention, the log of events is not often referenced directly, but rather only inferentially when extending the platform configuration register (PCR) as a corresponding log entry is written during the PCR extension operation. In any event, in order to maintain the integrity of the log and a high degree of trust in the trusted platform, measurements are recorded by the TPM consistently from one boot cycle to the next for the trusted platform. Moreover, only a single TPM is permitted for use by any one trusted platform.

Presently, merged computing configurations have been deployed in a computing architecture where each system in the configuration boots as a group of distinct systems. These systems eventually are joined in a rendezvous process that unifies the distinct systems into a single system or partition. To that end, the unified system can contain multiple TPMs—one for each physical chassis with unique contents. Without unifying the data from the multiple TPMs under a single TPM for the system, however, the predicate of trusted computing will have been violated. While some have proposed rudimentary unification solutions such as system re-measurement during rendezvous, and higher level measurement at boot time for the unified system, both lose the granularity required to maintain trust for the platform.

BRIEF SUMMARY OF THE INVENTION

Embodiments of the present invention address deficiencies of the art in respect to TPM unification in a trusted computing environment and provide a novel and non-obvious method, system and computer program product for trusted platform module data harmonization. In one embodiment of the invention, a TPM log harmonization method can include designating both a single master TPM for a master node among multiple nodes, and also a multiplicity of subsidiary TPMs for remaining ones of the nodes. The method further can include extending the single master TPM with a measurement representing a rendezvous operation for the nodes.

In one aspect of the embodiment, the method can include measuring a subsidiary log for each of the subsidiary TPMs, wherein each measurement of a subsidiary log represents a digest of the subsidiary log. In the aspect of the embodiment, the method further can include extending each measurement of a subsidiary log into the single master TPM. Notably, in another aspect of the invention the method further can include writing a set of log entries from each subsidiary log to the single master log during the rendezvous operation, and capping each set of the log entries in the single master log. Finally, in yet another aspect of the embodiment, the method further can include extending only the single master TPM with a plurality of measurements obtained from the nodes subsequent to the rendezvous operation.

In another embodiment of the invention, a trusted computing platform data processing system can be provided. The system can include multiple nodes communicatively coupled to one another in a merged trusted computing platform. Each of the nodes can include a processor, a TPM and a corresponding log. The system further can include a single master node designated from among the nodes. The single master nodes can include a processor, a master TPM and a corresponding master log. Finally, the system can include multiple subsidiary nodes designated from among the nodes. The subsidiary nodes also can include a processor, a subsidiary TPM and a corresponding subsidiary log. Finally, the system can include rendezvous logic coupled to the single master node.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for trusted platform module data harmonization. In accordance with an embodiment of the present invention, a single TPM for a group of TPMs in merged configuration can be designated a master TPM, and the remaining TPMs can be designated as subsidiary TPMs. At the start of rendezvous for the TPMs, the log entries from each of the subsidiary TPMs can be written to the log for the master TPM. Each set of entries from a subsidiary TPM can be capped with a measurement for the subsidiary TPM. Upon completion of rendezvous, subsequently occurring measurements can be written to the log of the master TPM, irrespective of whether the measurement arises in a trusted platform for a subsidiary TPM. In this way, the TPM logs can be unified without losing granularity and without compromising the trusted nature of data in the logs for the TPMs.

Figure 1:
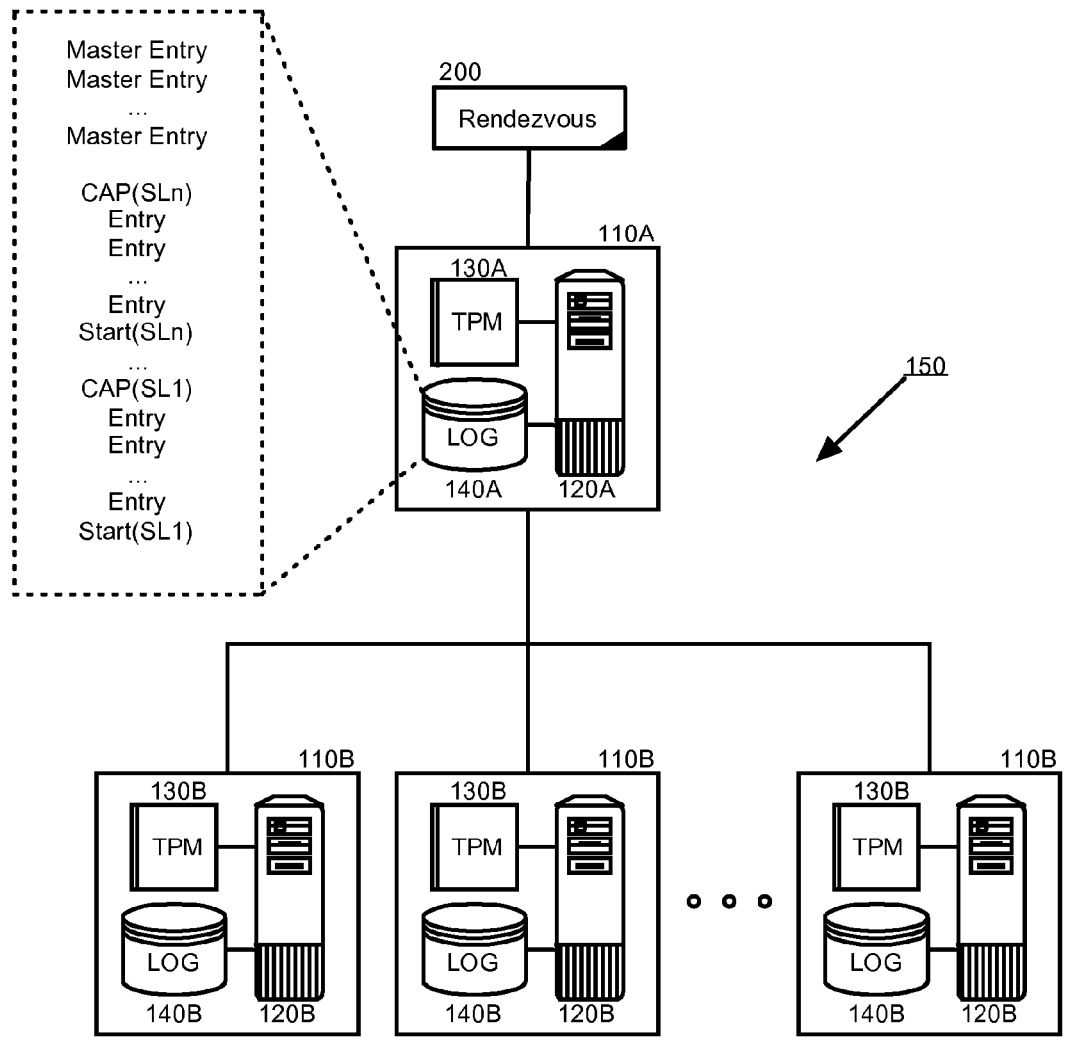
FIG. 1 is a schematic illustration of a data processing system configured for trusted platform module data harmonization; and, FIG. 2 is a flow chart illustrating a process for trusted platform module data harmonization.

In further illustration, FIG. 1 is a schematic illustration of a data processing system configured for trusted platform module data harmonization. The system can include multiple nodes 110A, 110B coupled together in a unified trusted computing platform 150. Each of the nodes 110A, 110B can include a computing platform 120A, 120B, a TPM 130A, 130B communicatively linked to the computing platform 120A, 120B, and a log 140A, 140B. Notably, all of the nodes 110B can be subsidiary to a single master node 110A. In this regard, the master node 110A further can include a master TPM 130A and corresponding master log 140A, whereas the subsidiary nodes 110B each can include a subsidiary TPM 130B and a subsidiary log 140B.

Rendezvous logic 200 can be coupled to the master node 110A. The rendezvous logic 200 can include program code enabled to process the entries of each log 140B of the subsidiary nodes 110B, into the master log 140A. In particular, the measurements of each subsidiary node 110B as recorded in the subsidiary logs 140B can be written to the master log 140A. Different groupings of entries for different ones of the subsidiary nodes 110B can be demarcated within the master log 140A through the use of a capping entry denoting a sequence of log entries for a specified one of the subsidiary nodes 110B. Upon completion of rendezvous, all subsequent measurements can be written as log entries only in the master log 140A, even where the measurements are obtained from a TPM 130B in one of the subsidiary nodes 110B.

Figure 2:
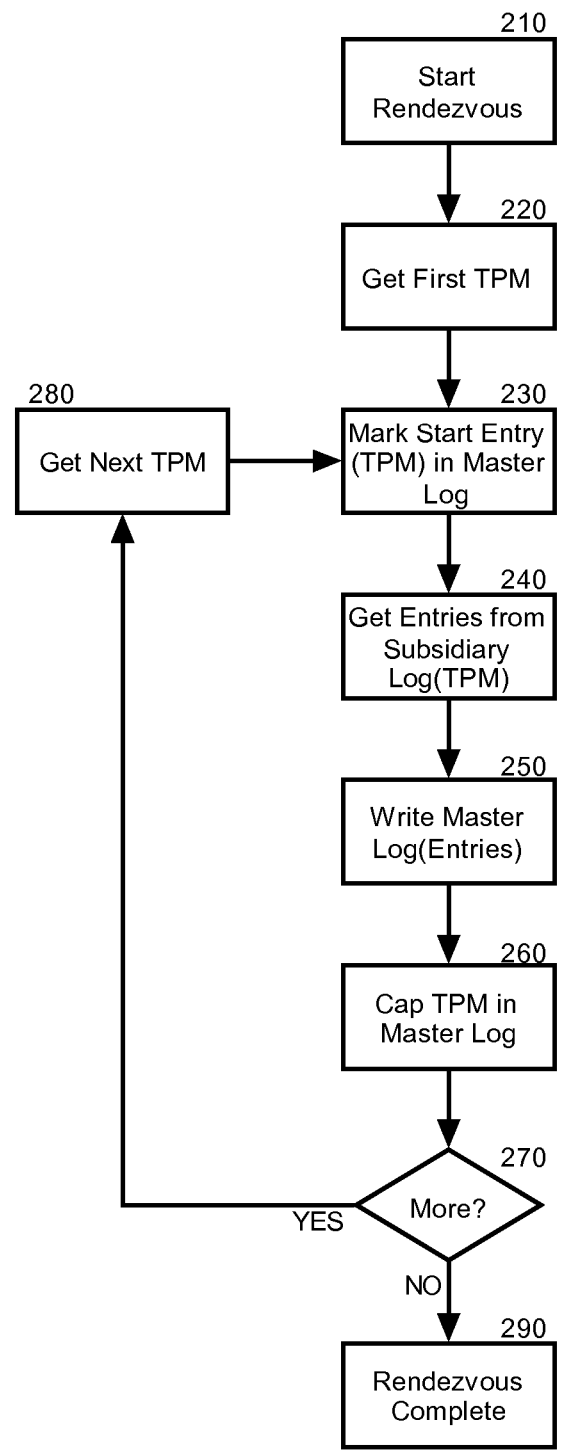

In yet further illustration, FIG. 2 is a flow chart illustrating a process for trusted platform module data harmonization as performed by the rendezvous logic 200 of FIG. 1. Beginning in block 210, the rendezvous process can commence and in block 220, a first TPM for a first node can be selected for processing. In block 230, a start entry for the first TPM can be marked in the master log for the master node. Thereafter, in block 240, the entries from the subsidiary log of the first TPM can be retrieved and in block 250 the retrieved entries can be written to the master log. Finally, in block 260 the entries for the first node can be capped in the master log.

In decision block 270, if additional nodes remain to be processed, in block 280 a next TPM for a next node can be selected for processing. Thereafter, in block 230 the process can repeat in which a new start entry is written to the master logic for the additional node and so forth. In decision block 270, when no further nodes remain to be processed, in block 290 the rendezvous can be complete and future TPM entries can be written to the master log only. Thus, while multiple nodes having corresponding TMs can be arranged in a unified trusted platform, the platform can remain trustworthy through the secure utilization of a single TPM having a corresponding log capturing measurements in a trusted manner from a multiplicity of TPMs in subsidiary nodes.

Importantly, the process illustrated in FIG. 2 represents one thorough aspect of the embodiments of the invention. It is to be understood, however, that other aspects can be acceptable. In a less thorough aspect, each subsidiary log can be measured and the measurement can be extended into the master TPM to form a digest of the entries of the subsidiary log. Consequently, the information in the master log can be less granular in nature. In many circumstances, however, granularity is not a requirement of a TPM based trusted platform. In an even less thorough aspect, a rendezvous event can be extended into the master log in order to memorialize the unification of the different nodes. In the latter circumstance, no granularity at all is retained from the different subsidiary logs of the subsidiary nodes.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

For the purposes of this description, a computer-usable or computer readable storage medium can be any apparatus that can contain or store the program for use by or in connection with the instruction execution system, apparatus, or device. The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

We claim:

1. A trusted platform module (TPM) log harmonization method comprising:
   designating by a processor both a single master TPM for a master node among a plurality of nodes, and also a multiplicity of subsidiary TPMs for remaining ones of the nodes; and,
   extending the single master TPM with a measurement comprising an event leading to a current configuration of at least one of the nodes and representing a rendezvous operation for the nodes, the rendezvous operation unifying the subsidiary nodes into the single master TPM by processing entries of each log of the subsidiary TPMs into a master log for the single master TPM the processing including writing during the rendezvous operation a set of log entries from each subsidiary log to the single master log, each entry comprising a measurement of a corresponding subsidiary log representing a digest of the corresponding subsidiary log, and capping each set of the log entries in the single master log.

2. The method of claim 1, further comprising:

measuring a subsidiary log for each of the subsidiary TPMs, each measurement of a subsidiary log representing a digest of the subsidiary log; and, extending each measurement of a subsidiary log into the single master TPM.

3. The method of claim 1, further comprising extending only the single master TPM with a plurality of measurements of events leading to a current configuration of at least one of the nodes obtained from the nodes subsequent to the rendezvous operation.

4. A trusted computing platform data processing system comprising:

a hardware processor;

a plurality of nodes communicatively coupled to one another in a merged trusted computing platform, each of the nodes comprising a processor, a trusted platform module (TPM) and a corresponding log;

a single master node designated from among the nodes, the single master node comprising a processor, a master TPM and a corresponding master log;

a plurality of subsidiary nodes designated from among the nodes, the single subsidiary node comprising a processor, a subsidiary TPM and a corresponding subsidiary log; and, rendezvous logic executed by the hardware processor and coupled to the single master node the rendezvous logic extending the single master TPM with a measurement comprising an event leading to a current configuration of at least one of the nodes and representing a rendezvous operation for the nodes, the rendezvous operation unifying the subsidiary nodes into the single master TPM by processing entries of each log of the subsidiary TPMs into a master log for the single master TPM the processing including writing during the rendezvous operation a set of log entries from each subsidiary log to the single master log, each entry comprising a measurement of a corresponding subsidiary log representing a digest of the corresponding subsidiary log, and capping each set of the log entries in the single master log.

5. The system of claim 4, wherein the master log comprises:

a plurality of entry sets for entries extracted from a subsidiary log, each of the entry sets having a cap referring to a subsidiary TPM associated with a corresponding one of the entry sets; and, a plurality of post-rendezvous entries comprising measurements from selected ones of the subsidiary nodes.

6. The system of claim 4, wherein the master log comprises a plurality of TPM digests for a corresponding subsidiary node.

7. The system of claim 4, wherein the master log comprises an entry for a rendezvous operation performed by the rendezvous logic.

8. A computer program product comprising a computer usable storage device comprising a non-transitory memory device storing therein computer usable program code for trusted platform module (TPM) log harmonization, the computer program product including:

computer usable program code designating both a single master TPM for a master node among a plurality of nodes, and also a multiplicity of subsidiary TPMs for remaining ones of the nodes; and, computer usable program code extending the single master TPM with a measurement comprising an event leading to a current configuration of at least one of the nodes and representing a rendezvous operation for the nodes, the rendezvous operation unifying the subsidiary nodes into the single master TPM by processing entries of each log of the subsidiary TPMs into a master log for the single master TPM the processing including writing during the rendezvous operation a set of log entries from each subsidiary log to the single master log, each entry comprising a measurement of a corresponding subsidiary log representing a digest of the corresponding subsidiary log, and capping each set of the log entries in the single master log.

9. The computer program product of claim 8, further comprising: computer usable program code measuring a subsidiary log for each of the subsidiary TPMs, each measurement of a subsidiary log representing a digest of the subsidiary log; and, computer usable program code extending each measurement of a subsidiary log into the single master TPM.

10. The computer program product of claim 8, further comprising computer usable program code extending only the single master TPM with a plurality of measurements of events leading to a current configuration of at least one of the nodes obtained from the nodes subsequent to the rendezvous operation.

* * * * *